United States Patent
Hasegawa et al.

(10) Patent No.: US 9,496,061 B2
(45) Date of Patent: Nov. 15, 2016

(54) RADIOGRAPHIC IMAGE CONVERSION PANEL

(71) Applicant: Konica Minolta, Inc., Tokyo (JP)

(72) Inventors: Takuji Hasegawa, Hamura (JP); Shigetami Kasai, Hino (JP); Naoyuki Sawamoto, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/293,327

(22) Filed: Jun. 2, 2014

(65) Prior Publication Data

US 2014/0361182 A1    Dec. 11, 2014

(30) Foreign Application Priority Data

Jun. 10, 2013   (JP) .................................. 2013-121820

(51) Int. Cl.
   *G01T 1/202*   (2006.01)
   *G21K 4/00*   (2006.01)
   *G01T 1/20*   (2006.01)

(52) U.S. Cl.
   CPC ................. *G21K 4/00* (2013.01); *G01T 1/202* (2013.01); *G01T 1/2018* (2013.01)

(58) Field of Classification Search
   CPC ........... G01T 1/2018; H01L 27/14663; H01L 31/02322; G21K 2004/06
   See application file for complete search history.

(56) References Cited

U.S. PATENT DOCUMENTS

| | | | |
|---|---|---|---|
| 6,875,990 B2 | 4/2005 | Isoda | |
| 8,629,405 B2 | 1/2014 | Kaneko et al. | |
| 2003/0042429 A1 | 3/2003 | Isoda | |
| 2008/0083877 A1* | 4/2008 | Nomura et al. | 250/370.11 |
| 2010/0117006 A1* | 5/2010 | Sawamoto et al. | 250/484.4 |
| 2012/0193543 A1* | 8/2012 | Kaneko et al. | 250/369 |
| 2014/0015082 A1* | 1/2014 | Kawanishi et al. | 257/429 |

FOREIGN PATENT DOCUMENTS

| | | |
|---|---|---|
| JP | 2001-059899 | 3/2001 |
| JP | 2003-028994 | 1/2003 |
| JP | 2006-064436 | 3/2006 |
| JP | 2012-159394 | 8/2012 |
| WO | 2010/032503 | 3/2010 |

OTHER PUBLICATIONS

John Rowlands, "Amorphous Semiconductor Usher in Digital X-ray Imaging", Physics Today, Nov. issue, 24 (1997).
L. E. Antonuk, "Development of a High Resolution Active Matrix Flat-Panel Imager with Enhanced Fill Factor", SPIE, 32, 2 (1997).

* cited by examiner

*Primary Examiner* — Mark R Gaworecki
*Assistant Examiner* — Kenneth J Malkowski
(74) *Attorney, Agent, or Firm* — Lucas & Mercanti, LLP

(57) ABSTRACT

The invention provides radiographic image conversion panels which ensure a high image quality (brightness) of the obtainable radiographic images and have excellent moisture proofness. The radiographic image conversion panel includes a photoelectric conversion element and a scintillator layer including a phosphor and one or more activators, the phosphor being in the form of columnar crystal. The activator concentration in the thickness direction of the scintillator layer gives a profile curve having two or more peaks. The amount of activator or activators present in a region of the scintillator layer extending over a thickness of 100 μm from a principal surface of the scintillator layer opposed to the photoelectric conversion element is 0.3 to 0.7 mol % (relative to the amount of phosphor base compound present in the region taken as 100 mol %).

8 Claims, 3 Drawing Sheets

RADIOGRAPHIC IMAGE CONVERSION PANEL

CROSS REFERENCE TO RELATED APPLICATION

This U.S. patent application claims priority under the Paris Convention of Japanese Patent Application No. 2013-121820 filed on Jun. 10, 2013, the entirety of which is incorporated herein by reference.

BACKGROUND OF THE INVENTION

1. Field of the Invention

The present invention relates to radiographic image conversion panels used in the formation of radiographic images.

2. Description of the Related Art

Radiographic images such as X-ray images have been widely used in medical diagnosis of disease conditions. In particular, radiographic images based on intensifying screen-film combinations have undergone enhancements in terms of sensitivity and image quality during a long history and consequently remain in use in the medical field worldwide as the imaging system with high reliability and excellent cost performance. However, this image information is analogue and thus cannot be processed freely or transmitted instantaneously in contrast to currently developing digital image information.

Recently, digital radiographic image detectors such as computed radiography (CR) systems and flat panel detectors (FPDs) have come in use. These radiographic image detectors directly give digital radiographic images and allow the images to be directly displayed on displays such as cathode ray tube panels and liquid crystal panels. Thus, there is no need for the images to be created on photographic films. Consequently, the digital radiographic image detectors such as X-ray image detectors have decreased a need for the image formation by silver halide photography and have significantly enhanced diagnostic convenience at hospitals and clinics.

The computed radiography (CR) is one of the digital X-ray image techniques currently used in medical practice. However, CR X-ray images are less sharp and are insufficient in spatial resolution as compared to screen film system images such as by silver halide photography, and the level of their image quality compares unfavorably to the quality level of screen film system images. Thus, new digital X-ray image techniques, for example, flat panel detectors (FPDs) involving thin film transistors (TFTs) have been developed (see, for example, Non Patent Literatures 1 and 2).

In principle, a FPD converts X-rays into visible light. For this purpose, a scintillator panel is used which has a phosphor (scintillator) layer made of an X-ray phosphor that, when illuminated with X-rays, converts the radiations into visible light that is emitted. In X-ray photography using a low-dose X-ray source, it is necessary to use a scintillator panel with high luminous efficiency (X-ray to visible light conversion) in order to enhance the ratio (the SN ratio) of signal to noise detected from the scintillator panel. In general, the luminous efficiency of scintillator panels is determined by the thickness of the scintillator layer (the phosphor layer) and the X-ray absorption coefficient of the phosphor. The light produced in the phosphor layer upon illumination with X-rays is scattered more markedly in the scintillator layer with increasing thickness of the phosphor layer, and consequently the sharpness of X-ray images obtained via the scintillator panel is lowered. Thus, setting of the sharpness required for the quality of X-ray images automatically determines the critical thickness of the phosphor layer in the scintillator panel.

Further, the shape of phosphor forming a phosphor layer is also important in order to obtain a scintillator panel which is able to give X-ray images having high brightness and excellent sharpness. In many scintillator panels, a scintillator layer is composed of columnar phosphor crystal. Usually, a plurality of such columnar crystals are disposed on bases such as substrates or supports. In order for scintillator layers to be able to efficiently emit light (fluorescence) produced therein in a direction perpendicular to the principal surface of the bases such as substrates or supports, the columnar crystals constituting the scintillator layers extend perpendicularly to the principal surface of the bases such as substrates or supports. With this configuration of scintillator layers, the scintillator panels ensure brightness and sharpness as well as achieve strength in the direction perpendicular to the bases such as substrates or supports (hereinafter, this direction will be also referred to as the "film thickness direction").

Various studies and attempts have been made focusing on the shapes of phosphor crystals that form scintillator layers. For example, Patent Literature 1 is directed to the realization of radiographic conversion panels which may provide scintillator panels capable of giving X-ray images having high brightness and excellent sharpness. In detail, Patent Literature 1 discloses a radiographic conversion panel having on a substrate a phosphor layer which includes a phosphor base material in the form of columnar crystals with a specific shape. The phosphor layer in the radiographic conversion panel of Patent Literature 1 has a combination of a first phosphor layer with a specific film thickness including a phosphor base material and a second phosphor layer containing the phosphor base material and an activator. The inventors of Patent Literature 1 have found that excellent sharpness is obtained when the columnar phosphor crystals forming the phosphor layer satisfy a specific ratio of the crystal diameter at the outermost surface of the scintillator layer to the crystal diameter at 10 µm height from the substrate side.

Further, Patent Literature 2 describes an approach to enhancing the image quality (the brightness) of the obtainable radiographic images. In detail, Patent Literature 2 discloses that emission brightness is improved by forming a phosphor layer by combined use of a phosphor and an activator so as to obtain a uniform activator concentration throughout the phosphor layer. Other methods such as increasing the activator concentration on the X-ray incident side are also known.

Furthermore, Patent Literature 3 proposes a radiographic image conversion panel which includes a stack of stimulable phosphor layers configured such that lower intensity and higher intensity are emitted alternately from the stimulable phosphor layers when the layers are excited by the incidence of excitation light applied from an excitation light source to the radiographic image conversion panel in a direction from the support side toward the phosphor layer surface side. Patent Literature 4 proposes a radiographic image detector in which a scintillator has an activator concentration that repeatedly changes between high and low levels at least locally in a radiation propagation direction and the activator concentration at the upper and lower ends of columnar crystals is lower than the high levels of activator concentration.

CITATION LIST

Patent Literature

Patent Literature 1: WO 2010/032503
Patent Literature 2: JP-A-2003-28994
Patent Literature 3: JP-A-2006-64436
Patent Literature 4: JP-A-2012-159394

Non Patent Literature

Non Patent Literature 1: John Rowlands, "Amorphous Semiconductor Usher in Digital X-ray Imaging", Physics Today, November issue, 24 (1997)
Non Patent Literature 2: L. E. Antonuk, "Development of a High Resolution Active Matrix Flat-Panel Imager with Enhanced Fill Factor", SPIE, 32, 2 (1997)

SUMMARY OF THE INVENTION

As mentioned above, the combined use of phosphor base components such as cesium iodide (CsI) with activators has been proposed to make columnar crystals that constitute scintillator layers in radiographic image conversion panels in order to enhance brightness and sharpness. However, the conventional techniques have problems in terms of moisture proofness of the scintillator layers in radiographic image conversion panels. Such poor moisture proofness ruins the improvement of brightness obtained by, for example, designing a radiographic image conversion panel such that the activator concentration in a scintillator layer is higher at a specific region on the X-ray incident side than at other regions. That is, moisture-labile scintillator layers are deteriorated by moisture and the brightness is lowered or becomes nonuniform depending on the environment in which the radiographic image conversion panels are stored.

The present invention has been made in order to solve the above problems in the art. It is therefore an object of the invention to provide radiographic image conversion panels which ensure a high image quality of the obtainable radiographic images (brightness of the radiographic images (hereinafter, sometimes referred to simply as "brightness")) and have excellent moisture proofness.

The present inventors have studied radiographic image conversion panels having scintillator layers on supports or photoelectric conversion elements. As a result, the present inventors have found the following, thus completing the invention.

Specifically, the present inventors have found that a radiographic image conversion panel ensuring a high image quality (brightness) of the obtainable radiographic images and having excellent moisture proofness may be obtained by configuring a scintillator layer such that the activator concentration in the thickness direction of the scintillator layer gives a profile curve having two or more peaks and the amount of activator present in a region of the scintillator layer extending over a thickness of 100 µm from a principal surface of the scintillator layer opposed to a photoelectric conversion element is 0.3 to 0.7 mol % relative to the amount of phosphor base compound present in the region taken as 100 mol %.

To achieve the above object, a radiographic image conversion panel of the present invention includes a photoelectric conversion element and a scintillator layer including a phosphor and one or more activators, the phosphor being in the form of columnar crystal, the activator concentration in the thickness direction of the scintillator layer giving a profile curve having two or more peaks, the amount of activator or activators present in a region of the scintillator layer extending over a thickness of 100 µm from a principal surface of the scintillator layer opposed to the photoelectric conversion element being 0.3 to 0.7 mol % (relative to the amount of phosphor base compound present in the region taken as 100 mol %).

In the radiographic image conversion panel of the invention, the phosphor in the form of columnar crystal preferably includes cesium iodide (CsI) as a main component.

In the radiographic image conversion panel of the invention, it is preferable that the one or more activators include at least one activator containing a thallium compound (Tl).

In the radiographic image conversion panel of the invention, it is preferable that the phosphor be in the form of a plurality of columnar crystals and the plurality of columnar crystals have root portions spaced apart from one another.

In the radiographic image conversion panel of the invention, it is preferable that the activator concentration profile curve show a peak of activator concentration both in a root portion side of the columnar crystal of the phosphor (a region extending over a thickness of 100 µm from a first principal surface of the scintillator layer wherein the first principal surface is the starting point of the growth of columnar crystal and the same applies hereinafter) and in an end portion side opposite to the root portion side (a region extending over a thickness of 100 µm from a second principal surface of the scintillator layer wherein the second principal surface is the surface opposite to the first principal surface and the same applies hereinafter).

Preferably, the radiographic image conversion panel of the invention further includes a support and a reflective layer, the reflective layer and the scintillator layer are disposed on the support, and the reflective layer includes a white pigment and a binder resin.

In the radiographic image conversion panel of the invention, it is preferable that the difference between the maximum value and the minimum value of activator concentration in the activator concentration profile curve be not less than 0.2 mol %.

In the radiographic image conversion panel of the invention, it is preferable that the phosphor in the form of columnar crystal be formed by a gas-phase deposition method.

ADVANTAGEOUS EFFECTS OF THE INVENTION

According to the invention, radiographic image conversion panels may be obtained which ensure a high image quality (brightness) of the obtainable radiographic images and have excellent moisture proofness. That is, the radiographic image conversion panels of the invention exhibit excellent moisture proofness and can give quality radiographic images having high brightness.

DESCRIPTION OF THE PREFERRED EMBODIMENTS

Hereinbelow, radiographic image conversion panels according to the present invention will be described in detail. The scope of the invention is not limited to the embodiments described below, and various modifications are possible without departing from the spirit of the invention.

Herein, the term "light" indicates electromagnetic waves that are mainly visible light in the ultraviolet to infrared region, in more detail, electromagnetic waves having wavelengths of 300 nm to 800 nm. The term "phosphor" or "scintillator" indicates a fluorescent material that absorbs energy of incident radiations such as X-rays and emits the "light".

[Radiographic Image Conversion Panels]

A radiographic image conversion panel of the present invention includes a photoelectric conversion element and a scintillator layer including a phosphor and one or more activators, the phosphor being in the form of columnar crystal. In the radiographic image conversion panel, the activator concentration in the thickness direction of the scintillator layer gives a profile curve having two or more peaks, and the amount of activator or activators present in a region extending over a thickness of 100 μm from a principal surface of the scintillator layer opposed to the photoelectric conversion element is 0.3 to 0.7 mol % (relative to the amount of phosphor base compound present in the region taken as 100 mol %).

Here, the term "principal surfaces" indicates "a pair of opposed surfaces having the largest area among the pairs of opposed surfaces of the scintillator layer regarded as a hexahedron".

The activator concentration profile curve represents a distribution of the concentration of activators in the thickness direction of the scintillator layer in the radiographic image conversion panel of the invention.

Figure 6A:
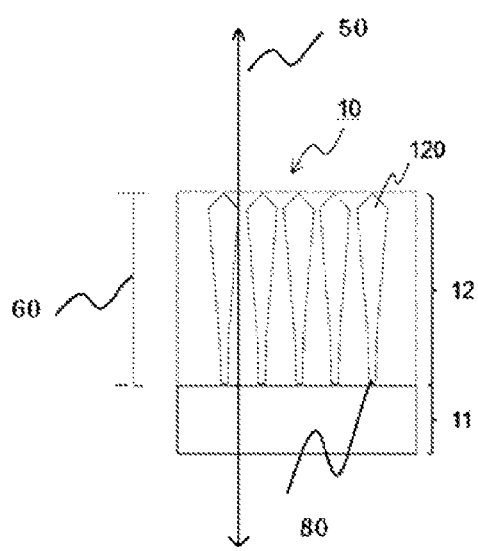
FIG. 6A is a view illustrating the thickness direction, and the height.
Figure 6B:
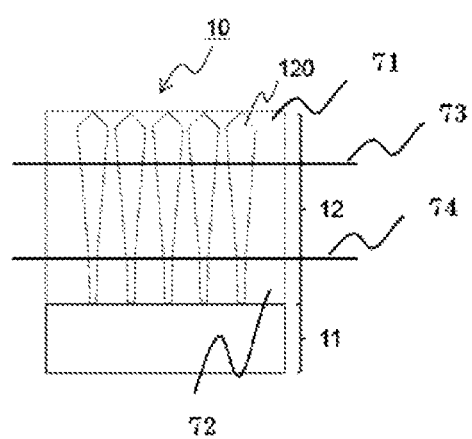
FIG. 6B is a view illustrating the end portion side and the root portion side of columnar crystals in a scintillator layer of (an example of) the inventive radiographic image conversion panel.

The thickness direction of the scintillator layer is, as indicated by an arrow in FIG. 6A, a direction perpendicular to the principal surfaces of the scintillator layer. FIGS. 6A and 6B are views schematically illustrating a radiographic image conversion panel having a scintillator layer on a support.

The activator concentration may be measured by inductively-coupled plasma optical emission spectrometry (ICP-OES). Examples of the ICP optical emission spectrometers for use in the invention include SPS3100 manufactured by Seiko Instruments Inc.

First, there will be described the particulation of the scintillator layer taking as an example a scintillator layer containing CsI as the phosphor base compound and a thallium compound as the activator. (The following description may be generalized by replacing the terms by the corresponding broader concepts, for example, CsI by a phosphor base compound, the TlI by an activator, the CsI:Tl film as a film of activated phosphor base compound, and the Tl atoms by atoms derived from the activator.) For example, a CsI:Tl film is formed with an appropriate thickness (for example, about 600 μm) on a support by vacuum deposition. The deposit top surface of the CsI:Tl film is shaved to a depth of approximately 100 μm with a cutter, thereby particulating or atomizing the scintillator layer. The particulate CsI:Tl is collected on powder paper. This procedure is repeated until the entirety of the scintillator layer is cut away (for example, six times when the thickness of the scintillator layer is about 600 μm). The portion of the CsI:Tl film that is particulated first from the deposit top surface is an activator concentration specimen for an end portion side (a region extending over a thickness of 100 μm from a second principal surface of the scintillator layer which is the surface opposite to a first principal surface that is the starting point of the growth of columnar crystal, see FIG. 6B). Similarly, the portion of the CsI:Tl film that is particulated last from the deposit top surface (for example, by the sixth operation when the thickness of the scintillator layer is about 600 μm) is an activator concentration specimen for a root portion side (a region extending over a thickness of 100 μm from the first principal surface of the scintillator layer which is the starting point of the growth of columnar crystal, see FIG. 6B). Further, the portions of the CsI:Tl film atomized by intermediate operations (for example, by the second to fifth operations when the thickness of the scintillator layer is about 600 μm) are activator concentration specimens for intermediate portions (for example, first to fourth intermediate portions from the side adjacent to the root portion side when the thickness of the scintillator layer is about 600 μm). In this process, each particulate portion of the CsI:Tl film is obtained in a weight of about 0.1 to 0.2 g. The mass is measured with a scale to the fourth decimal place.

The particles obtained from every 100 μm thick portions of the CsI:Tl film are analyzed to determine the average Tl concentrations. In this manner, the Tl concentrations may be measured with high accuracy. That is, changes in Tl concentration shown by the activator concentration profile curve indicate changes in the average activator concentration with respect to every 100 μm thick portions of the scintillator layer. The thickness in which the film is particulated is not necessarily 100 μm. For example, the film may be shaved in a thickness of 50 μm and over an increased area. Depending on the performance of the analyzer, the concentration study is feasible even with such a small thickness as about 10 μm. Although the particulation thickness may be selected freely, the present invention adopts 100 μm from the viewpoint of accurate measurement of the Tl concentration as described above.

Next, an example of the methods for dissolving the particles from the CsI:Tl film (the activator is TlI) will be described. The particles from the CsI:Tl film are weighed and placed into a 100 ml beaker. With a measuring pipette, commercial nitric acid (special grade, 69%) is added to the 100 ml beaker, which is then placed on a hot plate, and the mixture in the 100 ml beaker is heated until iodine ($I_2$) is evaporated and the mixture becomes colorless and transparent.

Here, the evaporation and vaporization of iodine occur by the following chemical changes:

The resultant colorless and transparent solution is added to a 50 ml measuring flask. In this process, the 100 ml beaker used in the heating is washed two or more times with small amounts of distilled water to transfer all the substances of interest. Distilled water is then added to a total volume of 50 ml at room temperature, which causes the generation of heat to raise the temperature of the content in the beaker. A measurement sample is thus prepared.

Next, the preparation of standard solutions for making a calibration curve will be described. A commercial thallium standard solution for atomic absorption spectrometry (concentration: 1000 ppm, for example, available from KANTO CHEMICAL CO., INC.) in volumes of 1 ml and 10 ml is added to separate 100 ml measuring flasks, and the total volume in each flask is adjusted to 100 ml by the addition of distilled water, thereby preparing 10 ppm and 100 ppm standard solutions. Distilled water is used as a 0 ppm standard solution.

A calibration curve is prepared using these standard solutions. The measurement sample is then analyzed, and the activator concentration is obtained with reference to the calibration curve.

In the case where the activator is, for example, a thallium compound, the concentration obtained by ICP-OES is the concentration of Tl atoms. Thus, the activator concentration is calculated based on the Tl atom concentration and the chemical formula of the activator.

Here, the "activator concentration" indicates the proportion of the amount of the activator (a raw material) determined from the concentration of the activator-derived atoms which are present in any of the approximately 100 μm thick regions in the scintillator layer, relative to the amount of the phosphor base compound (a raw material) which is involved in the formation of the phosphor in that region taken as 100 mol %. An example will be discussed in which the phosphor base compound is CsI and the activator is TlI as well as in which the amount of the phosphor base compound (CsI) involved in the formation of the approximately 100 μm thick region is 1 mol and the amount of Tl atoms derived from TlI is 0.005 mol. Since the amount of TlI giving 0.005 mol of Tl atoms is 0.005 mol, the activator concentration is calculated as a ratio of 0.005 mol TlI to 1 mol CsI, namely, 0.5 mol %.

As discussed above, the activator concentration is obtained on the raw material basis rather than being derived directly from the amounts of the components forming the phosphor in the scintillator layer.

The activator concentrations (mol %) in every 100 μm thick regions in the scintillator layer are plotted as the vertical axis on a graph versus the locations of the thickness (μm) in the scintillator layer as the horizontal axis. The plotted dots on the graph are then connected to give an activator concentration profile curve. (The activator concentrations in every 100 μm thick regions are shown as the vertical axis on a bar graph versus the locations of the thickness in the scintillator layer as the horizontal axis, and the middle points of the bars are connected, thereby obtaining FIG. 2.)

Figure 1:
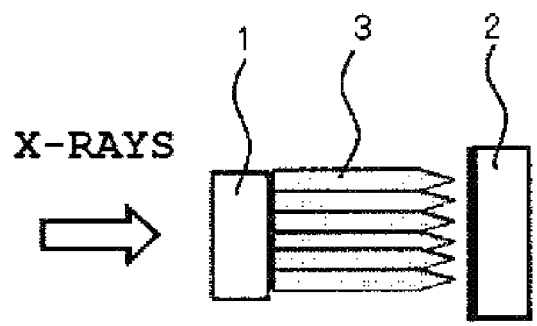
FIG. 1 is a schematic view illustrating an exemplary basic configuration of an inventive radiographic image conversion panel.
Figure 2:
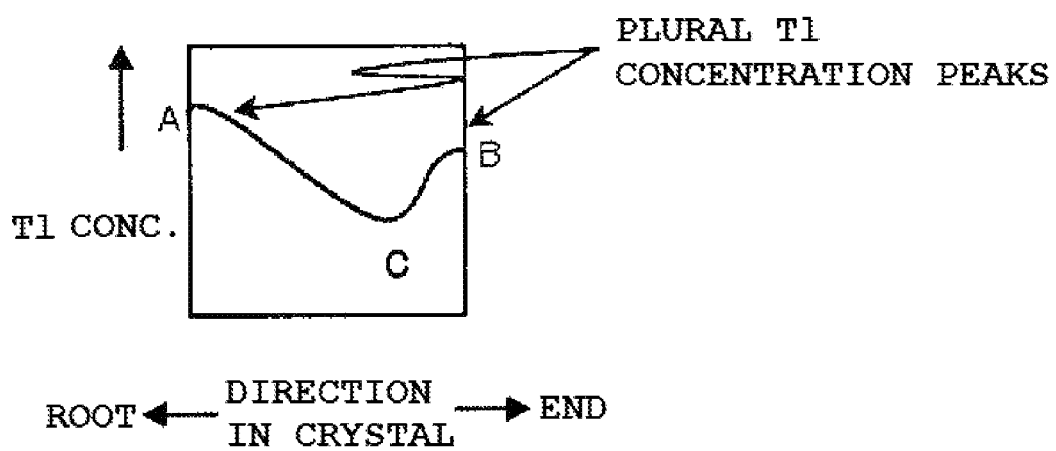
FIG. 2 is a diagram illustrating a relationship between locations in a scintillator layer in the direction of growth of columnar phosphor crystal (the thickness direction) and the concentration of thallium (Tl) derived from an activator.

An exemplary basic structure of the inventive radiographic image conversion panels is illustrated in FIG. 1. As illustrated in FIG. 1, the radiographic image conversion panel includes a panel containing a photoelectric conversion element (also referred to as a TFT panel) 2 and a scintillator layer 3 which includes a phosphor and one or more activators, the phosphor being in the form of columnar crystal. As illustrated in FIG. 2, the profile curve showing the activator concentration in the thickness direction of the scintillator layer 3 has plural (two or more) concentration peaks. Here, the concentration peak indicates a peak top value when the concentration profile curve shows a peak, or indicates a maximum value when the concentration increases and decreases monotonously (points A and B in FIG. 2). According to the concentration profile curve, the amount of activator or activators present in a region extending over a thickness of 100 μm from the second principal surface of the scintillator layer opposed to the photoelectric conversion element is 0.3 to 0.7 mol % relative to the amount of phosphor base compound present in the region taken as 100 mol %. When the amount of activator(s) present in the above region is in the range of 0.3 to 0.7 mol %, the radiographic image conversion panels exhibit excellent moisture proofness while maintaining a high level of image quality (brightness) of the obtainable radiographic images.

From viewpoints such as brightness and moisture proofness, it is preferable that the activator concentration profile curve show a peak of activator concentration both in a root portion side of the columnar crystal of the phosphor (a region extending over a thickness of 100 μm from the first principal surface of the scintillator layer wherein the first principal surface is the starting point of the growth of columnar crystal and the same applies hereinafter) and in an end portion side opposite to the root portion side (a region extending over a thickness of 100 μm from the second principal surface of the scintillator layer wherein the second principal surface is the surface opposite to the first principal surface and the same applies hereinafter). By increasing the activator concentration in the root portion side which lies on the radiation (for example, X-ray) incident side, the brightness of the obtainable radiographic images may be improved. Further, a high activator concentration in the end portion side which is opposite to the root portion side provides improved moisture proofness of the scintillator layer (and hence the radiographic image conversion panel). In the activator concentration profile curve shown in FIG. 2, the difference between the maximum value and the minimum value of activator concentration (in FIG. 2, the difference in activator concentration between the points A and C) is preferably not less than 0.2 mol %, and more preferably not less than 0.3 mol %. By ensuring that the largest difference in activator concentration is not less than 0.2 mol %, the radiographic image conversion panels exhibit excellent moisture proofness while maintaining a high level of image quality (brightness) of the obtainable radiographic images.

Preferably, the phosphor in the form of columnar crystal in the scintillator layer is formed by a gas-phase deposition method. It is also preferable that the phosphor be in the form of a plurality of columnar crystals and the plurality of columnar crystals have root portions spaced apart from one another.

Figure 3:
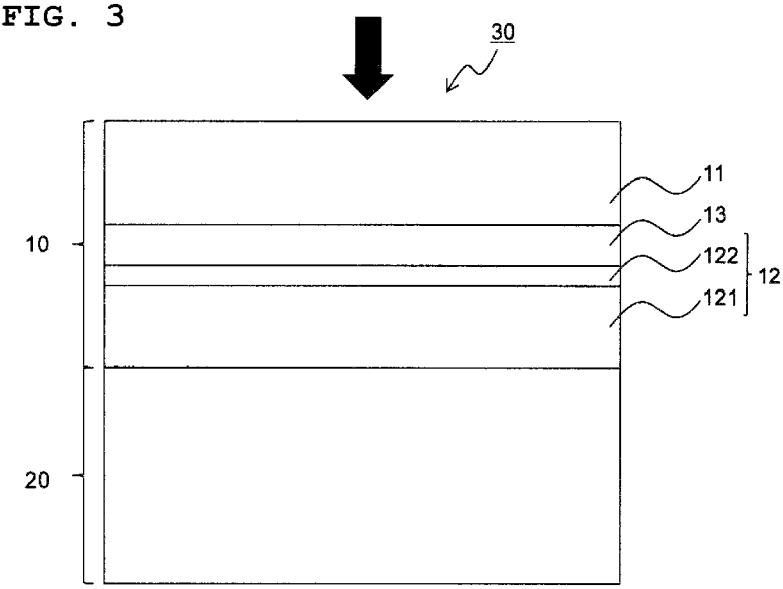
FIG. 3 is a schematic view illustrating an example of the configurations of the inventive radiographic image conversion panels.

In a more specific embodiment, the radiographic image conversion panel of the invention may include a scintillator panel (a panel which includes the scintillator layer and other layers such as a support and is coupled to the photoelectric conversion element). In such cases, the scintillator panel may further include additional layers (layers other than the scintillator layer) such as a reflective layer. For example, FIG. 3 illustrates such a radiographic image conversion panel 30 which includes a scintillator panel having additional layers such as a reflective layer 13. This radiographic image conversion panel 30 may be used as a radiographic image detector in which the light produced in the scintillator layer 12 is guided to the photoelectric conversion element (in FIG. 3, a photoelectric conversion element panel 20) and the image data is output in the form of electric signals.

Hereinbelow, the structural components will be sequentially described.

Scintillator Layers

In the radiographic image conversion panel of the invention, the scintillator layer serves to convert the energy of incident radiations such as X-rays into light such as visible light (namely, the light defined hereinabove).

The raw materials (phosphor base compounds) for forming the columnar crystal of phosphor (inactivated phosphor) which constitutes the scintillator layer are not particularly limited as long as the raw materials are capable of efficient conversion of the energy of incident radiations such as X-rays into light as well as can form columnar crystals. As long as these conditions are satisfied, any of various known (inactivated) phosphors may be used as the raw materials (the phosphor base compounds) for the formation of columnar crystal. In particular, suitable raw materials include cesium iodide (CsI), gadolinium oxysulfide (GOS), cadmium tungstate (CWO), gadolinium silicate (GSO), bismuth germanate (BGO), lutetium silicate (LSO) and lead tungstate (PWO). The phosphor base compounds used in the invention are not limited to instantaneous or direct-emission phosphors such as CsI, and stimulable phosphors such as cesium bromide (CsBr) may be used in accordance with the application of radiographic image conversion panels.

Of the phosphor base compounds used in the invention, CsI is preferable because this phosphor base compound has relatively high X-ray energy to visible light conversion efficiency and also because cesium iodide is easily deposited to form a columnar crystal and provides light guide effects ascribed to the crystal structure to suppress the scattering of light in the crystal and to allow the thickness of the phosphor layer (the scintillator layer) to be increased correspondingly to the amount of suppressed scattering.

In the radiographic image conversion panel of the invention, the scintillator layer contains a columnar crystal of the phosphor, and an activator(s) which activates the phosphor.

Cesium iodide as an example of the phosphors will be discussed. Cesium iodide alone as the raw material for the scintillator layer (the scintillator raw material) may fail to form a scintillator layer having sufficiently high luminous efficiency. Thus, it is preferable that the scintillator layer include an activated phosphor in which the phosphor base compound CsI has been activated with any of various activators. (Hereinbelow, the scintillator layer that includes an activated phosphor obtained by activating a phosphor base compound with an activator will be also referred to as a phosphor- and activator-containing scintillator layer or a phosphor/activator scintillator layer.) Examples of such scintillator layers include a scintillator layer disclosed in JP-B-S54-35060 which contains CsI and sodium iodide (NaI) in an appropriate molar ratio. Further, an example of preferred scintillator layers is one disclosed in JP-A-2001-59899 which contains CsI and activators such as thallium (Tl), europium (Eu), indium (In), lithium (Li), potassium (K), rubidium (Rb) and sodium (Na) in an appropriate molar ratio.

In the specification, the term "phosphor" refers to an inactivated phosphor itself and should be distinguished from a "phosphor that has been activated (activated phosphor)".

In the radiographic image conversion panel of the invention, a particularly preferred scintillator layer includes a phosphor (preferably cesium iodide) and one or more activators including a thallium compound as the raw materials.

In particular, a scintillator layer formed of cesium iodide and an activator(s) including a thallium compound is preferable because the thallium-activated cesium iodide (CsI:Tl) formed from these raw materials has a wide emission wavelength range from 300 nm to 750 nm.

Various thallium compounds (thallium (I) compounds and thallium (III) compounds) may be used, with examples including thallium iodide (TlI), thallium bromide (TlBr), thallium chloride (TlCl) and thallium fluoride (TlF and $TlF_3$). In particular, thallium iodide (TlI) is preferable because of the excellent degree of activation of the phosphor (in particular, CsI).

The thallium compounds preferably have a melting point in the range of 400 to 700° C. This melting point of the thallium compounds ensures that the activator is efficiently incorporated into the columnar phosphor crystal in the scintillator layer formed by deposition, and the activated phosphor achieves improved luminous efficiency compared to that of the phosphor itself. Herein, the melting point is measured at normal pressure (usually about 0.101 MPa).

In the scintillator layer in the radiographic image conversion panel of the invention, the relative content of the activators in the scintillator layer is preferably 0.1 to 5 mol %.

Herein, the relative content of the activators is the molar percentage of the activators relative to the phosphor base compound present in the specific region taken as 100 mol %.

The term "phosphor base compound" refers to the phosphor itself such as CsI that has not been activated with activators. The raw materials for the scintillator layers such as the phosphor base compounds and the activators are collectively referred to as scintillator raw materials.

In the radiographic image conversion panel of the invention, the profile curve indicating the activator concentration in the thickness direction of the scintillator layer shows two or more peaks. For example, this configuration may be achieved by depositing the scintillator layer with a deposition apparatus while controlling the activator concentration by regulating the heating temperature for a deposition source containing the activator in the apparatus or by appropriately operating a shutter disposed on the deposition source.

The scintillator layer may be a single layer or may include two or more layers. That is, the scintillator layer may be composed of a single layer or may be a stack of two or more layers in which an underlayer and a further layer(s) are disposed in this order on a support. When the scintillator layer is composed of two or more layers including an underlayer, these layers may include the same or different materials as long as the phosphor base compounds are identical. That is, the scintillator layer may be a single layer formed from the raw materials including a phosphor base compound and an activator, or may be a stack which includes an underlayer formed from a phosphor base compound alone as the raw material, and a further layer distinct from the underlayer that is formed from the raw materials including the phosphor base compound and an activator, or may be a stack which includes an underlayer formed from the raw materials including a phosphor base compound and a first activator, and a further layer distinct from the underlayer that is formed from the raw materials including the phosphor base compound and a second activator.

In the case where the scintillator layer is made such that columnar crystals having independent root portions are formed, it is preferable that the raw materials for forming the underlayer do not include an activator because such a scintillator layer with independent root portions can be formed with higher accuracy. (This does not eliminate the possibility that the activator is caused to migrate from an upper layer into the underlayer by heating or the like after the formation of the scintillator layer and consequently the underlayer comes to contain the activator.)

In the invention, the scintillator layer preferably includes (1) an upper layer formed from raw materials including a phosphor base compound and an activator, and (2) an underlayer which is formed from the phosphor base compound as the raw material between a support and the upper layer and has a higher void content than the upper layer.

The formation of the underlayer realizes good crystallinity of the columnar crystal and thus the amount of light emitted by the phosphor is increased. Further, the storage properties of the radiographic image conversion panels are improved, and the brightness of the obtainable radiographic (X-ray) images is enhanced.

Herein, the void content refers to the ratio of the total sectional area of voids to the sum of the sectional area of the columnar crystal of phosphor (when the phosphor in the cross section has not been activated) or activated phosphor (when the phosphor in the cross section has been activated) plus the total sectional area of the voids with respect to the cross section of the scintillator layer parallel to the principal surface of the support.

The void content may be determined by cutting the phosphor layer (the scintillator layer) of the radiographic image conversion panel parallel to the principal surface of the support, and digitizing a scanning electron micrograph of the cross section with use of an image processing software into the columnar crystal of phosphor or activated phosphor and the voids.

In the underlayer, the relative content of the activator is preferably 0.01 to 1 mol %, and more preferably 0.3 to 0.7 mol % (relative to the phosphor base compound in the underlayer taken as 100 mol %). This relative content of the activator in the underlayer is highly preferable in terms of the improvement of the brightness of radiographic images as well as the storage properties of the radiographic image conversion panels.

From viewpoints such as the luminous efficiency of the scintillator layer, the degree of orientation based on an X-ray diffraction spectrum with respect to a plane of the phosphor in the scintillator layer having a certain plane index is preferably in the range of 80 to 100% at any position in the thickness direction of the scintillator layer. For example, the plane index in the columnar crystal of thallium-activated cesium iodide (CsI:Tl) may be any of indices including (100), (110), (111), (200), (211), (220) and (311), and is preferably (200). (For the plane indices, refer to X-Sen Kaiseki Nyuumon (Introduction to X-ray analysis) (Tokyo Kagaku Dojin), pp. 42-46.)

Herein, the "degree of orientation based on an X-ray diffraction spectrum with respect to a plane having a certain plane index" indicates the proportion of the intensity Ix of the certain plane index relative to the total intensity I of the total including planes with other plane indices. For example, the degree of orientation of the intensity I200 of the (200) plane in an X-ray diffraction spectrum is obtained by: "Degree of orientation=I200/I".

For example, the plane indices for the determination of the orientation degree may be measured by X-ray diffractometry (XRD) (crystal X-ray diffractometry or powder X-ray diffractometry). The X-ray diffractometry is a versatile analytical technique capable of identifying substances or obtaining information about structures such as crystal phase structures by utilizing a phenomenon in which a characteristic X-ray having a specific wavelength is diffracted by crystalline substances according to the Bragg's equation.

The illumination targets may be Cu, Fe and Co, and the illumination outputs are generally about 0 to 50 mA and about 0 to 50 kV in accordance with the performance of the apparatus.

In the radiographic image conversion panel of the invention, the phosphor that constitutes the scintillator layer is in the form of columnar phosphor crystal described above. From the viewpoint of the durability of the radiographic image conversion panel, it is preferable that the scintillator layer be comprised of a plurality of columnar crystals and root portions of the columnar crystals be independent from one another at the principal surface of the scintillator layer on the root side. Specifically, the inventive radiographic image conversion panel is preferably configured such that root portions of a plurality of columnar crystals constituting the scintillator layer are spaced apart from one another without being connected together. This configuration of columnar crystals ensures that a pressing load applied to the radiographic image conversion panel in the thickness direction will be dispersed and the columnar crystals will be less deformed, thereby enhancing the durability of the radiographic image conversion panels. Here, the term "root portion side" indicates regions in the scintillator layer that extend over a thickness of 100 µm from the first principal surface of the scintillator layer that is the starting point of the growth of columnar crystals. In relation to this, the term "end portion side" is defined to indicate regions in the scintillator layer that extend over a thickness of 100 µm from the second principal surface of the scintillator layer that is the surface opposite to the first principal surface.

The independency of the root portions may be confirmed by observation with an electron microscope.

In the radiographic image conversion panel of the invention, the thickness of the scintillator layer is preferably 100 to 1000 µm, more preferably 100 to 800 µm, and still more preferably 120 to 700 µm because this thickness ensures that a good balance is obtained between brightness and sharpness of radiographic images obtained via the inventive radiographic image conversion panel.

The thickness of the underlayer is preferably 0.1 µm to 50 µm, more preferably 3 µm to 50 µm, and still more preferably 5 µm to 40 µm from the viewpoint of high brightness of the obtainable radiographic images and to ensure the sharpness of radiographic images.

It is preferable that the crystal diameters of the columnar crystals constituting the scintillator layer satisfy the relationship $1 \leq (b/a) \leq 3$, and more preferably $1 \leq (b/a) \leq 2$ wherein the letter a is the average crystal diameter of the columnar crystals at a height of 1 µm, and the letter b is the average crystal diameter of the columnar crystals at a height of 3 µm, both heights being values from the principal surface on the root portion side of the scintillator layer. When the value of (b/a) is 3 or less, the columnar crystals are prevented from deformation due to excessive local stress concentration when a pressure is applied in the thickness direction of the radiographic image conversion panel, and thus the strength of the scintillator layer and hence the strength of the radiographic image conversion panel may be advantageously ensured. On the other hand, controlling the (b/a) ratio to 1 or more is generally easy in production steps.

Here, the term "height" indicates a distance from the first principal surface of the scintillator layer (the starting point of the growth of columnar crystals) toward (in a vertical direction) the second principal surface of the scintillator layer that is opposite to the first principal surface (see FIG. 6A).

From the viewpoint of the strength against a pressure in the thickness direction of the radiographic image conversion panel, it is more preferable that the (b/a) ratio be in the above range and the average crystal diameter b be not more than 3 μm. When this condition is met, the radiographic image conversion panel exhibits strength to a certain extent even when the scintillator layer has no underlayer. However, the addition of an underlayer increases the strength and makes it possible to provide radiographic images with high brightness and excellent sharpness as well as a good balance between these qualities.

To ensure sharpness, it is preferable that the columnar crystals constituting the scintillator layer have an average crystal diameter c of not more than 10 μm, and more preferably not more than 8 μm as measured with respect to an uppermost portion (the principal surface on the end portion side) of the scintillator layer.

In the invention, the term "average crystal diameter" specifically indicates an "average circular equivalent diameter". This "average circular equivalent diameter" is measured by a process in which the columnar crystal-containing scintillator layer is coated with a conductive substance (such as platinum palladium alloy, gold or carbon) and analyzed with a scanning electron microscope (SEM) (S-800 manufactured by Hitachi, Ltd.) to determine the diameters of circles circumscribed around the cross sections of respective columnar crystals, and the thus-obtained circular equivalent diameters of thirty columnar crystals are averaged.

The average crystal diameter a of the columnar crystals at a height of 1 μm, and the average crystal diameter b of the columnar crystals at a height of 3 μm are each an average crystal diameter obtained by the observation of a crystal face exposed by filling the crystals with an appropriate resin such as an epoxy resin and polishing the surface of the crystal film until the thickness of the scintillator layer from the principal surface on the root portion side becomes 1 μm or 3 μm.

The average crystal diameter c of the columnar crystals at an uppermost portion of the scintillator layer is an average crystal diameter obtained by the observation of a crystal face exposed by filling the crystals with an appropriate resin such as an epoxy resin and polishing the columnar crystals by 10 μm from the principal surface on the end portion side.

The scintillator layer may be disposed on a photoelectric conversion element (for example, a panel containing a photoelectric conversion element) or an optional support described later, directly or via an additional layer.

For example, a radiographic image conversion panel which has a scintillator layer disposed directly on a panel containing a photoelectric conversion element is a so-called "direct-deposition FPD". In this case, a support described later is not required.

Alternatively, a scintillator layer may be formed directly on a support by such a method as deposition to produce a scintillator panel (in which a reflective layer described later may be provided or absent and the support may be removed afterward) and the scintillator panel may be bonded (coupled) to a separate panel containing a photoelectric conversion element. This type of radiographic image conversion panel is a so-called "detached-type FPD".

As described above, the scintillator layer in the inventive radiographic image conversion panel may be disposed directly on an appropriate layer (or panel) in accordance with the purpose.

Photoelectric Conversion Elements

The photoelectric conversion elements used in the inventive radiographic image conversion panels serve to absorb the light produced in the scintillator layer and convert the light into electric signals in the form of electric charges, and to output the electric signals to the outside of the radiographic image conversion panels. Conventional photoelectric conversion elements may be used.

Here, the photoelectric conversion element may be incorporated in, for example, a panel. The configuration of such a panel including the photoelectric conversion element (a photoelectric conversion element panel) is not particularly limited, but is usually such that a photoelectric conversion element panel substrate, an image signal output layer and the photoelectric conversion element are stacked together in this order.

The photoelectric conversion elements may have any structures as long as they absorb the light produced in the scintillator layer and convert it into the form of electric charges. For example, the photoelectric conversion elements used in the inventive radiographic image conversion panels may have a transparent electrode, a charge generation layer that generates electric charges by being excited by the incident light, and a counter electrode. These transparent electrode, charge generation layer and counter electrode may be conventional. Alternatively, the photoelectric conversion elements used in the inventive radiographic image conversion panels may be comprised of appropriate photosensors. For example, the photoelectric conversion elements may be formed of a plurality of two-dimensionally arranged photodiodes or may be comprised of two-dimensional photosensors such as charge coupled devices (CCDs) and complementary metal-oxide-semiconductor (CMOS) sensors.

Supports

The radiographic image conversion panel of the invention may include a support as required. The support serves as abase on which the columnar crystal for the scintillator layer is formed as well as holds the structure of the scintillator layer.

Examples of the materials for the supports include various glasses, polymer materials and metals which are transmissive to radiations such as X-rays. Specific examples of such materials include plate glasses such as quartz, borosilicate glass and chemically reinforced glass; amorphous carbon; ceramics such as sapphire, silicon nitride and silicon carbide; semiconductors such as silicon, germanium, gallium arsenide, gallium phosphide and gallium nitride; polymer films (plastic films) such as cellulose acetate films, polyester resin films, polyethylene terephthalate films, polyamide films, polyimide films, triacetate films, polycarbonate films and carbon fiber-reinforced resin sheets; metal sheets such as aluminum sheets, iron sheets and copper sheets, as well as metal sheets having layers of oxides of the metals; and bio-nanofiber films. These materials may be used singly, or two or more may be stacked together.

Of the above materials for the supports, flexible polymers having a thickness of 50 to 500 μm are particularly preferable. In particular, polyimides are preferable from the viewpoint of heat resistance during deposition. Here, the term "flexible" means that the elastic modulus at 120° C. (E120) is 0.1 to 300 GPa. Further, the term "elastic modulus" indicates a value obtained by testing a JIS-C2318 sample with a tensile tester, and calculating the ratio of the stress over the strain indicated by the gauge marks on the sample, in the range in which the strain stress curve shows a straight relationship. This ratio is called the Young's modulus. In the specification, this Young's modulus is defined as the elastic modulus.

The support preferably has an elastic modulus at 120° C. (E120) of 0.1 to 300 GPa, and more preferably 1 to 100 GPa.

Specific examples of the flexible polymer films include polyethylene naphthalates (7 GPa), polyethylene terephthalates (4 GPa), polycarbonates (2 GPa), polyimides (7 GPa), polyetherimides (3 GPa), aramids (12 GPa), polysulfones (2 GPa) and polyether sulfones (2 GPa). (The numbers in parenthesis indicate elastic moduli.) The values of elastic modulus are variable even in polymer films of the same material, and the values in parenthesis are not absolutely correct and should be considered as a guide. The above polymer materials are advantageous in that the materials have high heat resistance and can withstand deposition of phosphor. In particular, polyimides possess especially high heat resistance and are suitable in the case where the columnar crystal of phosphor (scintillator) is formed by a gas-phase method using CsI (cesium iodide) as the raw material.

The flexible polymer film may be a single polymer film, a film of a mixture of the above polymers, or a stack of two or more identical or different polymer layers.

The use of a bio-nanofiber film as the support provides benefits in terms of support characteristics and environmental friendliness because the bio-nanofiber films have characteristics which are not possessed by existing glasses or plastics such as (i) low weight, (ii) strength five times or more greater than iron (high strength), (iii) resistance to swelling by heat (low thermal expansion properties), (iv) being flexible (excellent flexibility), (v) feasibility of various treatments such as mixing, coating and film production, and (vi) combustibility of plant fiber materials.

In order to, for example, adjust the reflectance of the support, a light-shielding layer and/or a light-absorbing pigment layer may be provided on the support made of the above material. Further, the support may be one imparted with light-absorbing properties or light-reflecting properties or may be a colored support for the purpose of, for example, adjusting the reflectance. Examples of such support materials include white PET films and black PET films containing white pigments or carbon blacks.

The light-shielding layer and the pigment layer may be provided as separate films. This configuration will be described later in the section of "Additional layers".

Examples of the supports having light-shielding properties or light-reflecting properties include various metal plates and amorphous carbon plates. When the metal plates are used as the supports, aluminum plates having a thickness of 0.2 mm to 2.0 mm are preferable from the viewpoints of X-ray transmission properties and handling properties.

Examples of the colored supports include films containing coloring materials such as pigments (pigments are more preferable). The use of such colored supports is preferable from the viewpoint of the adjustment of reflectance of the supports for deposition.

From the viewpoint of the adjustment of reflectance of the supports (for example, supports for deposition), it is preferable to provide on the support a reflective layer formed by dispersing a coloring material such as a pigment (a pigment is more preferable, and a white pigment is particularly preferable) in a binder resin (namely, a reflective layer containing a binder resin and a coloring material (more preferably a pigment, and particularly preferably a white pigment)). From the viewpoint of the enhancement of reflectance, the pigment is preferably a white pigment.

The binder resins in the reflective layers are not particularly limited as long as the object of the invention is achieved. The binder resins may be purchased in the market or may be produced appropriately. Specific examples include polyurethanes, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyamide resins, polyvinylbutyrals, polyester resins, cellulose derivatives (such as nitrocellulose), styrene-butadiene copolymers, various synthetic rubber resins, phenolic resins, epoxy resins, urea resins, melamine resins, phenoxy resins, silicone resins, fluororesins, acrylic resins and urea formamide resins. Of these, hydrophobic resins such as polyester resins and polyurethane resins are preferable because of excellent interlayer adherability with respect to the columnar phosphor crystal formed by deposition and to the support. The resins may be used singly, or two or more may be used in combination. In particular, controlling of film properties is advantageously facilitated by combined use of two or more resins having a difference in glass transition temperature (Tg) of not less than 5° C. Such two or more resins used in combination may be of the same kind or different kinds as long as their glass transition temperatures are different.

Examples of the pigments in the supports or the binder resins in the reflective layers include insoluble azo pigments such as First Yellow, Disazo Yellow, Pyrazolone Orange, Lake Red 4R and Naphthol Red; condensed azo pigments such as Cromophtal Yellow and Cromophtal Red; azo lake pigments such as Lithol Red, Lake Red C, Watching Red, Brilliant Carmine 6B and Bordeaux 10B; nitroso pigments such as Naphthol Green B; nitro pigments such as Naphthol Yellow S; phthalocyanine pigments such as Phthalocyanine Blue, First Sky Blue and Phthalocyanine Green; threne pigments such as Anthrapyrimidine Yellow, Perinone Orange, Perylene Red, Thioindigo Red and Indanthrone Blue; quinacridone pigments such as Quinacridone Red and Quinacridone Violet; dioxadine pigments such as Dioxadine Violet; isoindolinone pigments such as Isoindolinone Yellow; acidic dye lakes such as Peacock Blue Lake and Alkali Blue Lake; and basic dye lakes such as Rhodamine Lake, Methyl Violet Lake and Malachite Green Lake.

Examples of the white pigments include alumina, yttrium oxide, zirconium oxide, titanium dioxide, barium sulfate, silica, zinc oxide and calcium carbonate.

The amount of the pigments is preferably 0.01 to 10 parts by weight with respect to 100 parts by weight of the resin forming the support film or with respect to 100 parts by weight of the binder resin in the reflective layer. This amount of the pigments ensures sufficient coloring of the support or the reflective layer (for example, ensures that a reflective coating liquid containing the pigments can form a sufficiently colored film on the support) and prevents deteriorations in mechanical properties such as elongation and strength of the resin forming the support film or the binder resin in the reflective layer due to excessive addition of the pigments over the saturated coloration of the support or the reflective layer.

Additional Layers

The radiographic image conversion panel of the invention may further include additional layers such as reflective layers, protective layers, moistureproof protective layers, light-shielding layers and pigment layers in addition to the scintillator layer, similarly to known scintillator panels.

(Reflective Layers)

Hereinbelow, the reflective layers will be described in more detail.

The materials of the reflective layers are as described hereinabove.

The radiographic image conversion panel of the invention includes a scintillator layer and a photoelectric conversion element, and thus may be used as a radiographic image detector. In this case, the scintillator layer optionally having a protective layer (described later) is preferably coupled directly to a photoelectric conversion element panel containing the photoelectric conversion element. This configuration is advantageous in that the light produced in the scintillator layer may be allowed to be incident on the photoelectric conversion element panel efficiently.

In order to allow the light (fluorescence) produced in the scintillator layer to be more effectively directed to the photoelectric conversion element panel, it is preferable that the inventive radiographic image conversion panel further include a reflective layer on the principal surface of the scintillator layer opposite to the photoelectric conversion element panel. In the case where the inventive radiographic image conversion panel includes a support, the reflective layer is preferably disposed on the principal surface of the scintillator layer opposite to the photoelectric conversion element panel as well as between the support and the scintillator layer. Such a configuration is advantageous in that the light (fluorescence) produced in the scintillator layer may be more effectively directed to the photoelectric conversion element panel. Here, the reflective layer is a layer capable of reflecting the portion of light (fluorescence) produced in the phosphor layer (the scintillator layer) that propagates toward the principal surface of the scintillator layer opposite to the photoelectric conversion element panel, back toward the principal surface of the scintillator layer adjacent to the photoelectric conversion element panel.

In the inventive radiographic image conversion panel, the reflective layer may be made of any of the aforementioned materials used in conventional scintillator plates. In particular, metals having high reflectance are preferable. The electric conductivity of the metals is preferably not less than 6.0 S/m (Siemens per meter), and more preferably not less than 30 S/m. The reflective layer may include one, or two or more kinds of metals. Examples of the high-reflectance metal films include materials including at least one metal selected from the group consisting of Al, Ag, Cr, Cu, Ni, Mg, Pt and Au. Of these metals, Al (40 S/m), Ag (67 S/m) and Au (46 S/m) are particularly preferred from the viewpoints of reflectance and electrical conductivity. The reflective layer may be comprised of a white pigment and an appropriate binder resin. Details are as mentioned hereinabove.

The reflective layer may include a single layer, or two or more layers.

The reflective layer may be directly attached onto the substrate such as the support by vacuum deposition, sputtering deposition or plating. From the viewpoint of productivity, sputtering deposition is preferred. The thickness of the reflective layer may vary depending on the film production method. The film thickness is preferably 50 nm to 400 nm in the case of vacuum deposition, and 20 nm to 200 nm in the case of sputtering deposition.

(Protective Layers for Reflective Layers)

When the inventive radiographic image conversion panel includes a reflective layer, a protective layer may be disposed between the reflective layer and the scintillator layer to prevent problems such as corrosion of the reflective layer by the phosphor in the scintillator layer. (Hereinafter, this protective layer will be also referred to as the "reflective layer-protecting layer".)

From the viewpoint of the improvements in adhesion and productivity, the reflective layer-protecting layer is preferably formed by the application and drying of a coating solution of a resin in a solvent. From the viewpoint of the interlayer adherability with respect to the deposited crystal (the phosphor in the form of columnar crystal in the scintillator layer) and to the reflective layer, the resin in the reflective layer-protecting layer (the resin dissolved in the solvent) is preferably a polymer having a glass transition temperature of 30 to 100° C.

Specific examples of the resins for the reflective layer-protecting layers include polyurethane resins, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyamide resins, polyvinylbutyrals, polyester resins, cellulose derivatives (such as nitrocellulose), styrene-butadiene copolymers, various synthetic rubber resins, phenolic resins, epoxy resins, urea resins, melamine resins, phenoxy resins, silicone resins, fluororesin, acrylic resins and urea formamide resins, with polyester resins being preferable.

In terms of adhesion (interlayer adherability) with respect to the deposited crystal (the phosphor in the form of columnar crystal in the scintillator layer) and to the reflective layer, the thickness of the reflective layer-protecting layer is preferably not less than 0.1 μm, and is preferably not more than 3.0 μm in order to ensure smoothness of the surface of the reflective layer-protecting layer. The thickness of the reflective layer-protecting layer is more preferably in the range of 0.2 to 2.5 μm from the similar viewpoints.

Examples of the solvents used in the coating solutions for forming the reflective layer-protecting layers include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; aromatic compounds such as toluene, benzene, cyclohexane, cyclohexanone and xylene; esters of lower fatty acids with lower alcohols such as methyl acetate, ethyl acetate and butyl acetate; ethers such as dioxane, ethylene glycol monoethyl ether and ethylene glycol monomethyl ether; and mixtures of these solvents.

(Moistureproof Protective Layers)

In the case where the radiographic image conversion panel of the invention includes a scintillator panel, the outer periphery of the scintillator panel is preferably covered with a moistureproof protective layer. The moistureproof protective layer serves to prevent the entirety of the scintillator panel from an entry of moisture and to suppress the degradation of the scintillator layer (when, for example, the phosphor of the scintillator layer is deliquescent, the degradation of the scintillator layer due to deliquesce of the phosphor is suppressed).

In the case where the radiographic image conversion panel of the invention does not include a scintillator panel (for example, when the scintillator layer is disposed directly on a photoelectric conversion element panel), all the surfaces of the scintillator layer which are not in contact with any other layers are preferably covered with a moistureproof protective layer.

Examples of the moistureproof protective layers include protective films having low moisture permeability and moistureproof films such as polyparaxylylene films.

For example, the protective films may be polyethylene terephthalate (PET) films. Examples of the protective films other than PET films include polyester films excluding PET films, polymethacrylate films, nitrocellulose films, cellulose acetate films, polypropylene films and polyethylene naphthalate films. In accordance with the required moisture proofness, substances such as metal oxides may be deposited onto these films and a plurality of such deposition-coated films may be stacked on top of one another to give a moistureproof protective layer.

When the scintillator panel includes a support, a heat fusible resin is preferably disposed on the opposite surfaces of the scintillator panel on the support side and on the photoelectric conversion element panel side to seal the layers such as the support, the scintillator layer and the photoelectric conversion element panel by fusion bonding. (The layers of this heat fusible resin covering the layers such as the support, the scintillator layer and the photoelectric conversion element panel will be also referred to as the "fusion bonding layers".) In this case, the layers such as the support, the scintillator layer and the photoelectric conversion element panel may be sealed by fusion bonding the heat fusible resin as described below. The fusion bonding layers may be any of common resin films which are fusion-sealable with an impulse sealer. Examples include, but are not limited to, ethylene vinyl acetate copolymer (EVA) films, polypropylene (PP) films and polyethylene (PE) films.

The moistureproof protective layers may be formed on the radiographic image conversion panel by interposing the scintillator panel between upper and lower heat fusible resin films serving as protective films (hereinafter, also referred to as the moistureproof protective films), and fusion bonding the end regions of the upper and lower moistureproof protective films in contact with each other in a vacuum environment.

The thickness of the moistureproof protective films is preferably 10 to 100 µm.

The moistureproof protective films are imparted with moisture proofness. In detail, in order to prevent the degradation of the scintillator layer, the moisture permeability (or moisture vapor transmission rate) of the moistureproof protective films is preferably not more than 50 g/m²·day, more preferably not more than 10 g/m²·day, and particularly preferably not more than 1 g/m²·day. The moisture permeability of the moistureproof protective films may be measured with reference to the method specified in JIS Z 0208.

Specifically, the moisture permeability of the moistureproof protective films may be measured by the following method. A space is partitioned with the moistureproof protective film at 40° C., and one side is maintained at 90% relative humidity (RH) and the other side in a dry state using a hygroscopic agent. The mass (g) of vapor passed through the protective film (per 1 m² of the protective film) in 24 hours is defined as the moisture permeability of the moistureproof protective film.

In order to obtain or control the moisture permeability of the moistureproof protective films in the above range and thereby to enhance the moisture proofness of the moistureproof protective films, it is preferable to use polyethylene terephthalate films or deposition-coated polyethylene terephthalate films having a thin film of aluminum oxide deposited thereon.

The moistureproof protective layers may be moistureproof films such as polyparaxylylene films. In this case, the support having the phosphor layer (the scintillator layer) may be placed in a deposition chamber of a CVD apparatus, and diparaxylylene may be sublimated in the deposition chamber. In this manner, a polyparaxylylene film may be deposited onto the entirety of the surface of the scintillator panel.

The scintillator panel obtained as described above is coupled to, for example, a photoelectric conversion element panel, thus forming a radiographic image conversion panel according to the invention.
(Light-Shielding Layers)

The light-shielding layers include materials having light-shielding properties.

From the viewpoint of adjusting the reflectance of the support, preferred light-shielding materials for the light-shielding layers are metal materials (metal films) including one, or two or more of aluminum, silver, platinum, palladium, gold, copper, iron, nickel, chromium, cobalt and stainless steel. In particular, aluminum- or silver-based metal materials are particularly preferable because such light-shielding layers exhibit excellent light-shielding properties and corrosion resistance. The light-shielding layer may be composed of a single film of the metal material, or may include two or more films of the metal materials.

In order to increase the adhesion between the support and the light-shielding layer, an intermediate layer is preferably disposed between the support and the light-shielding layer. Examples of the materials of the intermediate layer include general adhesive polymers (such as epoxy resins), as well as metals different from the metals in the light-shielding layers (dissimilar metals). Examples of the dissimilar metals include nickel, cobalt, chromium, palladium, titanium, zirconium, molybdenum and tungsten. The intermediate layer may include one, or two or more kinds of these dissimilar metals. In particular, it is preferable that nickel or chromium, or both of these metals be contained from the viewpoint of the light-shielding properties of the light-shielding layer.

From the viewpoint of luminous efficiency, the thickness of the light-shielding layer is preferably 0.005 to 0.3 µm, and more preferably 0.01 to 0.2 µm.

The light-shielding layer made of such a metal material also serves as an antistatic layer and thus may be suitably used for antistatic purposes in the radiographic image conversion panel of the invention. The light-shielding layer made of the aforementioned metal material may be provided as an antistatic layer instead of or in combination with the reflective layer containing an antistatic agent. In this case, to prevent static electricity on the inventive radiographic image conversion panel, the surface resistivity measured with respect to a sample stack including the reflective layer on the support, specifically, with respect to the surface of the reflective layer opposite to the surface adjacent to the support is preferably not more than $1.0 \times 10^{12} \Omega/\square$, more preferably not more than $1.0 \times 10^{11} \Omega/\square$, and most preferably not more than $1.0 \times 10^{10} \Omega/\square$. (The symbol $\square$ in the unit $\Omega/\square$ indicates square. The same applies hereinafter.)

The light-shielding layer may be provided over the entirety of the principal surface on one side of the support by any methods without limitation. For example, the metal material may be deposited or sputtered to form a light-shielding layer on the entirety of the principal surface on one side of the support, or a metal foil as the light-shielding layer may be laminated onto the entirety of the principal surface on one side of the support. From the viewpoint of the adhesion of the light-shielding layer with the support, the light-shielding layer is most preferably formed by sputtering on the entirety of the principal surface on one side of the support.
(Pigment Layers)

The pigment layers are not particularly limited as long as the layers have light-absorbing properties and are pigmented. For example, layers including a pigment and a binder resin may be used. The pigments in the pigment layers may be any known pigments. Suitable pigments are those capable of absorbing long-wavelength red light which is more prone to scatter, and blue pigments are preferred. Examples of preferred blue pigments include ultramarine blue and Prussian blue (iron ferrocyanide). Further, examples of suitable organic blue pigments include phthalocyanine, anthraquinone, indigoid and carbonium. Of these organic blue pigments, phthalocyanine is preferable from viewpoints such as radiation durability and UV durability of the pigment layers. Examples of the binder resins in the pigment layers include polyurethanes, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyamide resins, polyvinylbutyrals, polyester resins, cellulose derivatives (such as nitrocellulose), styrene-butadiene copolymers, various synthetic rubber resins, phenolic resins, epoxy resins, urea resins, melamine resins, phenoxy resins, silicone resins, fluororesins, acrylic resins and urea formamide resins. Of these, hydrophobic resins such as polyester resins and polyurethane resins are preferable, and polyester resins and polyurethane resins are more preferable because of excellent interlayer adherability with respect to the columnar phosphor crystal (formed by, for example, deposition) and to the support. From the viewpoint of the light-absorbing properties of the pigment layer, the amount of the pigments in the pigment layer is preferably 0.01 to 10 parts by weight with respect to 100 parts by weight of the binder resin.

From the viewpoint of cuttability, the thickness of the pigment layer is preferably 1 to 500 µm.

For example, the pigment layer may be formed to cover the entirety of the principal surface on one side of the support by the application and drying of a pigment coating liquid containing the aforementioned pigment and solvent onto the principal surface on one side of the support.

[Methods for Manufacturing Radiographic Image Conversion Panels]

The radiographic image conversion panels of the invention may be manufactured by any methods without limitation as long as the object of the invention is not impaired. Basically, the inventive radiographic image conversion panels may be manufactured by methods similar to those for the manufacturing of known radiographic image conversion panels. From the viewpoint of the strength of the inventive radiographic image conversion panels, a preferred method is one in which the scintillator layer is produced by forming columnar phosphor crystals such that the root portions of the columnar crystals are spaced apart from one another.

In detail, a scintillator panel may be obtained by optionally forming layers such as a reflective layer and a protective layer on a support according to known techniques, and thereafter forming a scintillator layer and further a moistureproof protective layer as required by a known method. Here, the reflective layer, the protective layer and the moistureproof protective layer may be formed by the methods described in the sub-sections of "Reflective layers", "Protective layers" and "Moistureproof protective layers" in the section of "Additional layers". A photoelectric conversion element panel may then be coupled to the above scintillator panel to produce a radiographic image conversion panel according to the present invention.

Alternatively, a photoelectric conversion element panel may be used in place of the support. In this case, a radiographic image conversion panel of the invention may be obtained by forming a scintillator layer on the photoelectric conversion element panel directly or via a planarized layer of an acrylic resin or a polyimide resin, and further forming a reflective layer and a moistureproof protective layer as required.

The formation of the scintillator layer is not limited to any particular methods as long as a phosphor that will constitute the scintillator layer may form a columnar crystal. A preferred method is such that the columnar crystals can be formed with root portions separate and independent from one another. In the method for manufacturing the inventive radiographic image conversion panels, the scintillator layer is preferably formed by a gas-phase method, specifically by a deposition method.

Figure 4:
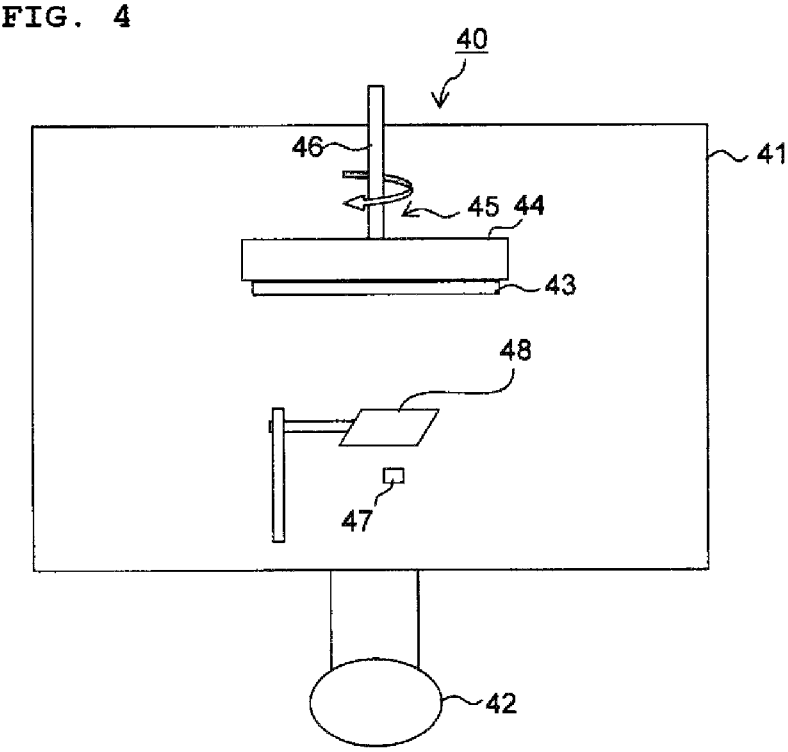
FIG. 4 is a schematic view illustrating a configuration of an exemplary deposition apparatus used in the invention.

While the apparatuses used in the deposition methods are not particularly limited, for example, a deposition apparatus 40 illustrated in FIG. 4 is preferably used.

Figure 5:
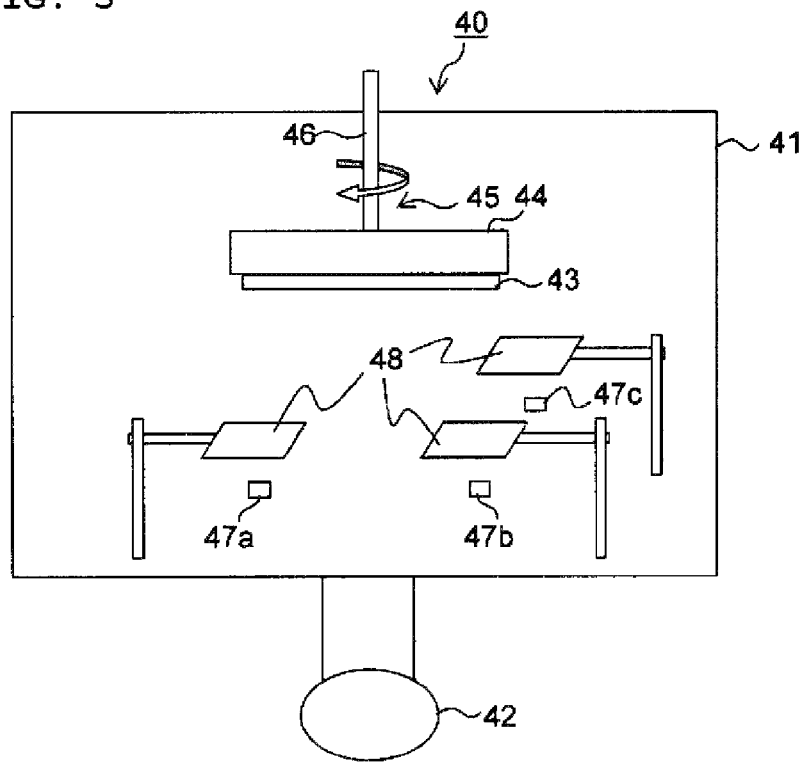
FIG. 5 is a schematic view illustrating another configuration of an exemplary deposition apparatus used in the invention.

As illustrated in FIG. 4, the deposition apparatus 40 has a box-shaped vacuum container 41, in which a deposition source 47 is arranged. The deposition source 47 is placed in a container furnished with a heating device, and may be heated by the operation of the heating device. For the formation of a scintillator layer, a phosphor base compound, or a mixture including a phosphor base compound and an activator is loaded in the container furnished with a heating device. Specifically, the phosphor base compound or the mixture as the deposition source 47 may be heated and vaporized by the operation of the heating device. As illustrated in FIG. 5, a plurality of deposition sources 47 may be disposed. While FIG. 5 illustrates three deposition sources 47, namely, deposition sources 47a, 47b and 47c, the number of deposition sources may be changed with respect to materials for forming the scintillator layer.

The deposition source 47 which contains the activator is preferably loaded in a container separate from the container containing the phosphor base compound. According to this configuration, the activator concentration at individual locations in the columnar crystal (in particular, in the thickness direction of the scintillator layer) may be controlled with higher accuracy by separately adjusting the heating temperature for the deposition source 47 including the activator or by operating a shutter 48.

For example, the container furnished with a heating device may be a resistance-heating crucible. Here, the materials of the containers may be ceramics such as alumina or high-melting metals such as tantalum and molybdenum.

In the vacuum container 41, a holder 44 for holding a deposition substrate 43 is disposed immediately above the deposition source 47. Here, the deposition substrate 43 may be a support itself (without any other layers such as a reflective layer and a protective layer stacked thereon) or a stack of a support with other layers such as a reflective layer and a protective layer.

The holder 44 is provided with a heater (not shown) and is configured to heat the deposition substrate 43 attached to the holder 44 by the operation of the heater. Heating of the deposition substrate 43 detaches or removes substances which have been adsorbed to the surface of the deposition substrate 43 before the deposition of scintillator layer, prevents an impurity layer from occurring between the deposition substrate 43 and the scintillator layer formed on the substrate surface, increases the adhesion between the deposition substrate 43 and the scintillator layer, and controls the quality of the scintillator layer formed on the surface of the deposition substrate 43.

The holder 44 is provided with a rotating mechanism 45 capable of rotating the holder 44. The rotating mechanism 45 is comprised of a rotating shaft 46 connected to the holder 44, and a motor (not shown) which serves as a power supply driving the rotating shaft 46. Driving of the motor causes the rotating shaft 46 to be rotated and hence the holder 44 to be rotated while being opposed to the deposition source 47.

In addition to the above configuration, the deposition apparatus 40 includes a vacuum pump 42 connected to the vacuum container 41. The vacuum pump 42 evacuates the vacuum container 41 and introduces a gas to the inside of the vacuum container 41. The inside of the vacuum container 41 can be maintained in a constant pressure gas atmosphere by the operation of the vacuum pump 42.

In the formation of scintillator layer in the radiographic image conversion panel of the invention, a phosphor is loaded into the container furnished with a heating device, and the apparatus is evacuated while an inert gas such as nitrogen is simultaneously introduced through an inlet to adjust the pressure in the apparatus at about 1.333 Pa to $1.33 \times 10^{-3}$ Pa. Subsequently, the phosphor is heated and vaporized to deposit a phosphor crystal onto the surface of the deposition substrate 43 (which is a support optionally having additional layers such as a reflective layer and a protective layer). When the crystal deposition involves a mixture of a phosphor and an activator, a deposition apparatus 40 illustrated in FIG. 5 may be used, and the phosphor as the phosphor base raw material may be loaded into a first container furnished with a heating device and the activator into a second container furnished with a heating device to form deposition sources 47a and 47b, respectively (the deposition source 47c in FIG. 5 and a third container furnished with a heating device which contains the deposition source 47c may be omitted).

To form a scintillator layer having two or more layers including an underlayer, a phosphor for the formation of underlayer, an optional activator for the formation of underlayer, a phosphor for the formation of upper scintillator layer portion, and an activator for the formation of upper scintillator layer portion may be loaded into respective containers having separate heating devices, and deposition may be performed while controlling the amounts of the deposition sources loaded and/or operating shutters 48 in accordance with the implementation of deposition of the respective deposition sources.

The crystal diameters of the columnar crystals formed on the deposition substrate 43 may be controlled by regulating the temperature of the deposition substrate 43. That is, the crystal diameters are increased with increasing temperature of the deposition substrate 43. In the case where the columnar crystals are to be formed so as to have independent root portions, it is therefore necessary that the temperature of the deposition substrate 43 at the start of deposition be low, and preferably 5° C. to 320° C. Further, the rate of heating of the deposition substrate 43 at an initial stage of deposition is preferably controlled to an appropriately low rate in order to ensure the appropriately low ratio (b/a) of the average crystal diameter b of the columnar crystals at a height of 3 µm to the average crystal diameter a of the columnar crystals at a height of 1 µm. For example, it is preferable to control the heating rate for the deposition substrate 43 such that the difference in substrate temperature is within 100° C. between at the start of deposition on the deposition substrate 43 (when the height of the columnar crystals is 0 µm) and when 3 µm root portions of the phosphor are deposited on the deposition substrate 43 (when the height of the columnar crystals has reached 3 µm). After the 3 µm root portions are deposited, the temperature of the deposition substrate 43 is preferably maintained at 150° C. to 320° C. until the completion of deposition. Heating of the deposition substrate 43 at an excessively high rate in an initial stage of deposition may cause local discontinuous changes in columnar crystal diameters in the scintillator layer. But the presence of such variations does not prevent the inventive radiographic image conversion panels from functioning appropriately.

When the scintillator layer has two or more layers including an underlayer, the thickness of the underlayer may be controlled to be in the preferred range defined in the section of "Scintillator layers" by performing deposition while controlling the amount of phosphor base material loaded in the container furnished with a heating device (for example, a resistance-heating crucible) for the deposition of underlayer, or while controlling when and how long the shutter 48 will be open or closed. In order to ensure that the scintillator layer includes columnar crystals having independent root portions as well as that the obtainable radiographic image conversion panels give radiographic images such as X-ray images with higher brightness and enhanced sharpness, it is preferable that the temperature of the deposition substrate 43 during the formation of the underlayer be 15° C. to 50° C., and it is particularly preferable that the deposition substrate 43 be not heated during the formation of the underlayer.

The upper layer(s) on the underlayer may be formed by depositing crystals onto the underlayer under the same conditions and by the same method as described above, namely, by heating and vaporizing a mixture of the phosphor base compound and an activator loaded in a container furnished with a heating device, or by heating and vaporizing the phosphor base compound and an activator loaded in respective containers furnished with separate heating devices. The thickness of the upper layer(s) on the underlayer may be adjusted by controlling the amount of phosphor base compound (and activator) loaded in the container(s) furnished with a heating device for the formation of upper scintillator layer portion, or by controlling when and how long the shutter(s) 48 will be open or closed.

EXAMPLES

The present invention will be described in further detail based on Examples. However, the scope of the invention is not limited to such Examples and various modifications are possible within the spirit of the invention.

Example 1

(Support)

A 125 µm thick polyimide film (UPILEX-1255 manufactured by UBE INDUSTRIES, INC.) was used as a support for a radiographic image conversion panel.

(Formation of Scintillator Layer)

In Example 1, a scintillator layer was formed with a deposition apparatus 40 illustrated in FIG. 5 (except that a deposition source 47c was omitted) in the following manner. In this Example, the scintillator layer was composed of a single layer without an underlayer (CsI was loaded in a crucible (a first resistance-heating crucible) and deposited onto a principal surface on one side of the support throughout the procedure).

First, a phosphor raw material (CsI) as a deposition material was loaded into a first resistance-heating crucible, and an activator (TlI) into a second resistance-heating crucible. The contents in these resistance-heating crucibles were deposition sources 47a and 47b, respectively. The support as a deposition substrate 43 was placed onto a rotatable holder 44. The gap between the deposition substrate 43 and the deposition sources 47 was adjusted to 400 mm. (Specifically, the gap between the deposition substrate 43 and the deposition source 47a, and the gap between the deposition substrate 43 and the deposition source 47b were both adjusted to 400 mm.)

Next, with a vacuum pump 42, a vacuum container 41 in the deposition apparatus 40 was evacuated and the degree of vacuum in the vacuum container 41 in the deposition apparatus 40 was adjusted to 0.5 Pa (absolute pressure) by introducing Ar gas. Thereafter, the deposition substrate 43 together with the holder 44 was rotated at 10 rpm. The temperature of the deposition substrate 43 was controlled to 250° C. at the start of deposition. The first resistance-heating crucible was heated to allow the phosphor to be deposited onto the scintillator formation scheduled surface of the deposition substrate, thereby forming 3 µm thick root portions of a scintillator layer to be formed. After the formation of root portions, the temperature of the deposition substrate 43 was controlled to 200° C., and heating of the second resistance-heating crucible was started. Upper portions for constituting a scintillator layer were thus deposited onto the root portions. In this process, the activator concentrations in the respective regions (root portion side, end portion side and intermediate portions) of the scintillator layer were controlled by adjusting the deposition rate for the activator. Specifically, the heating temperature for the second resistance-heating crucible was manipulated such that the activator concentration would be 0.7 mol % in the root portion side of the scintillator layer, 0.4 mol % in the end portion side of the scintillator layer, and 0.2 mol % in the 200-300 µm thickness section of the intermediate portions between the root portions and the end portions. Here, the heating of the deposition substrate 43 was performed by heating the holder 44.

The deposition was terminated when the thickness of the scintillator layer reached 400 µm. Thus, a panel was obtained which had the scintillator layer in the prescribed film thickness on the scintillator formation scheduled surface of the deposition substrate 43. (Hereinafter, the panel will be also referred to as the "scintillator panel".)

Next, PaxScan (FPD: 2520 manufactured by Varian) was provided, and the scintillator panel built in PaxScan was replaced by the scintillator panel obtained above. Thus, a radiographic image conversion panel (also referred to as "FPD" in this section) was obtained.

Example 2

(Support)
A 125 µm thick polyimide film (UPILEX-1255 manufactured by UBE INDUSTRIES, INC.) was used as a support for a radiographic image conversion panel.
(Formation of Scintillator Layer)
In Example 2, a scintillator layer was formed on a principal surface on one side of the support with a deposition apparatus 40 illustrated in FIG. 5 in the following manner. (In Example 2, a scintillator layer was formed by forming an underlayer on a principal surface on one side of the support and subsequently forming a further layer on the underlayer (specifically, CsI loaded in a first resistance-heating crucible was deposited, and CsI loaded in a second resistance-heating crucible was further deposited thereon).)

First, a phosphor raw material (CsI) as a deposition material was loaded into two resistance-heating crucibles, and an activator (TlI) into another resistance-heating crucible. The resistance-heating crucibles containing the phosphor raw material were the first and second resistance-heating crucibles, and the resistance-heating crucible containing the activator was the third resistance-heating crucible. The contents in these first, second and third resistance-heating crucibles were deposition sources 47a, 47b and 47c, respectively. The support as a deposition substrate 43 was placed onto a rotatable holder 44. The gap between the deposition substrate 43 and the deposition sources 47a, 47b and 47c was adjusted to 400 mm. (Specifically, the gap between the deposition substrate 43 and the deposition source 47a, the gap between the deposition substrate 43 and the deposition source 47b, and the gap between the deposition substrate 43 and the deposition source 47c were all adjusted to 400 mm.)

Next, with a vacuum pump 42, a vacuum container 41 in the deposition apparatus 40 was evacuated and the degree of vacuum in the vacuum container 41 in the deposition apparatus 40 was adjusted to 0.5 Pa (absolute pressure) by introducing Ar gas. Thereafter, the deposition substrate 43 together with the holder 44 was rotated at 10 rpm.

The temperature of the deposition substrate 43 was controlled to 50° C. at the start of deposition. The first resistance-heating crucible and the third resistance-heating crucible were then heated to allow the materials to be deposited onto the scintillator formation scheduled surface of the deposition substrate 43, thereby forming 3 µm thick root portions of a phosphor layer (a scintillator layer) to be formed.

After the formation of root portions, the temperature of the deposition substrate 43 was controlled to 200° C., and heating of the second and third resistance-heating crucibles was started. Upper portions for constituting a scintillator layer were thus deposited onto the root portions. In this process, the activator concentrations in the respective regions (root portions, end portions and intermediate portions) of the scintillator layer were controlled by adjusting the deposition rate for the activator. Specifically, the heating temperature for the third resistance-heating crucible was manipulated such that the activator concentration would be 0.7 mol % in the root portion side of the scintillator layer, 0.5 mol % in the end portion side of the scintillator layer, and 0.2 mol % in the intermediate portions between the root portion side and the end portion side. Here, the heating of the deposition substrate 43 was performed by heating the holder 44.

The deposition was terminated when the thickness of the scintillator layer reached 400 µm. Thus, a panel (a scintillator panel) was obtained which had the scintillator layer in the prescribed film thickness on the scintillator formation scheduled surface of the deposition substrate 43.

Next, the scintillator panel was set on photoelectric conversion element panel PaxScan (FPD). Thus, a radiographic image conversion panel was obtained.

[Comparative Example 1]
A radiographic image conversion panel was obtained in the same manner as in Example 1, except that the heating temperature for the second resistance-heating crucible was adjusted during deposition to control the activator deposition rate such that the activator concentration would be 0.7 mol % in the root portion side of the scintillator layer, and 0.3 mol % in the end portion side and the intermediate portions of the scintillator layer.

[Comparative Example 2]
A radiographic image conversion panel was obtained in the same manner as in Example 1, except that the heating temperature for the second resistance-heating crucible was adjusted during deposition to control the activator deposition rate such that the activator concentration would be 0.3 mol % in the root portion side and the end portion side of the scintillator layer, and 0.7 mol % in the intermediate portions of the scintillator layer.

[Comparative Example 3]
A radiographic image conversion panel was obtained in the same manner as in Example 1, except that the heating temperature for the second resistance-heating crucible was adjusted during deposition to control the activator deposition rate such that the activator concentration would be 0.7 mol % uniformly from the root portion side to the end portion side of the scintillator layer.

[Evaluations of Scintillator Panels and Radiographic Image Conversion Panels]

The radiographic image conversion panels obtained in Examples and Comparative Examples were evaluated with respect to the following items (the peaks of activator concentration in the scintillator layers, the moisture proofness of the radiographic image conversion panels, and the brightness and MTF of radiographic (X-ray) images obtained).

Here, the evaluation of the brightness and MTF of radiographic (X-ray) images was made with the radiographic image conversion panels. The measurement of the activator concentration peaks in the scintillator layers, and the evaluation of the moisture proofness of the radiographic image conversion panels were performed with respect to the scintillator panels before the coupling to the photoelectric conversion element panels (FPDs). The results are described in Table 1.

(Measurement of Activator Concentration Peaks in Scintillator Layers)

The activator concentration was measured by ICP optical emission spectrometry using an ICP optical emission spectrometer (SPS3100 manufactured by Seiko Instruments Inc.) in accordance with the procedures mentioned in the description of activator concentration profile curve.

In detail, the scintillator layer formed by deposition was shaved with a cutter and each of approximately 100 µm thick portions starting from the deposit top surface (the principal surface on the end portion side of the scintillator layer) was obtained in the form of particulate crystal on powder paper. The procedure was repeated until the surface of the support was exposed. The crystals of every 100 µm thick portions collected on separate sheets of powder paper were analyzed with the analyzer to measure the activator concentration (the whole amount of crystal on each powder paper was subjected to the measurement).

(Brightness)

With an illuminator having a tube voltage of 80 kVp, the FPD of the radiographic image conversion panel was illuminated with X-rays. The obtained image data was analyzed to determine the average signal value. The brightness of the obtained radiographic (X-ray) image was evaluated based on this average signal value as the amount of luminescence. Table 1 compares the brightness of the radiographic image conversion panels based on the amount of luminescence obtained in Comparative Example 1. Namely, the brightness of the obtained radiographic (X-ray) image is represented by "x": less than 1 time, "Δ": 1 time (equivalent) to less than 1.2 times, and "◯": 1.2 times or greater than the brightness of the radiographic (X-ray) image obtained in Comparative Example 1 taken as 1.0.

(MTF)

With an illuminator having a tube voltage of 80 kVp, the radiation incident side of the FPD of the radiographic image conversion panel was illuminated with X-rays through a lead MTF chart. The image data was detected and was recorded on a hard disk. Thereafter, the image data recorded on the hard disk was analyzed with a computer to determine the MTF value (at a spatial frequency of 1 cycle/mm) of the X-ray image recorded on the hard disk, as the indicator of sharpness of the X-ray image. A larger value of MTF, which is an abbreviation for modulation transfer function, indicates higher sharpness.

The MTF values were measured with respect to nine locations in the radiographic image conversion panel, and the average of the results (the average MTF value) was evaluated. Table 1 compares the average MTF values of the radiographic image conversion panels based on the average MTF value obtained in Comparative Example 1. Namely, the average MTF values are represented by "⊙": 1.2 times or more, "◯": 1 time (equivalent) to less than 1.2 times, "Δ": 0.8 times to less than 1 time, and "x": less than 0.8 times compared to the average MTF value obtained in Comparative Example 1 taken as 1.0.

(Moisture Proofness)

The scintillator panel was allowed to stand in an environment at 40° C. and 80% RH for 40 hours, and was thereafter set on a FPD to form a radiographic image conversion panel. The brightness and MTF of a radiographic (X-ray) image obtained via the radiographic image conversion panel were measured according to the aforementioned methods. The performances of the radiographic image conversion panel before and after the humidity exposure were compared. Based on the result, the moisture proofness of the radiographic image conversion panel was evaluated.

The brightness and MTF of the radiographic (X-ray) image obtained via the radiographic image conversion panel including the humidity-tested scintillator panel were represented by "◯": 0.9 times to less than 1.1 times, "Δ": 0.8 to less than 0.9 times, or 1.1 to less than 1.2 times, and "x": less than 0.8 times, or 1.2 times or more relative to the brightness and MTF of the radiographic (X-ray) image obtained via the radiographic image conversion panel including the scintillator panel before the 40-hour exposure to the 40° C. and 80% RH environment.

TABLE 1

| | Tl concentration in respective regions in scintillator layer, mol % | | | Maximum activator concentration in scintillator layer, mol % | Minimum activator concentration in scintillator layer, mol % | Before exposure | | After exposure to 40° C. and 80% RH | |
|---|---|---|---|---|---|---|---|---|---|
| | Root portions 0-100 µm | Intermediate portions 200-300 µm | End portions 300-400 µm | | | Brightness | MTF | Brightness | MTF |
| Comp. Ex. 1 | 0.7 | 0.3 | 0.3 | 0.7 | 0.3 | ◯ | ◯ | Δ | X |
| Ex. 1 | 0.7 | 0.2 | 0.4 | 0.7 | 0.2 | ◯ | ◯ | ◯ | ◯ |
| Ex. 2 | 0.7 | 0.2 | 0.5 | 0.7 | 0.2 | ◯ | ⊙ | ◯ | ◯ |
| Comp. Ex. 2 | 0.3 | 0.7 | 0.3 | 0.7 | 0.3 | Δ | Δ | X | X |
| Comp. Ex. 3 | 0.7 | 0.7 | 0.7 | *1 | *1 | Δ | ◯ | Δ | Δ |

*1: In Comparative Example 3, the activator was distributed uniformly throughout the scintillator layer, and thus the activator concentration was constant at 0.7 mol %.

REFERENCE SIGNS LIST

1 . . . SUPPORT
2 . . . PHOTOELECTRIC CONVERSION ELEMENT PANEL
3 . . . SCINTILLATOR LAYER
10 . . . SCINTILLATOR PANEL
11 . . . SUPPORT
12 . . . SCINTILLATOR LAYER
120 . . . COLUMNAR CRYSTALS
121 . . . UPPER SCINTILLATOR LAYER PORTION
122 . . . UNDERLAYER
13 . . . REFLECTIVE LAYER
20 . . . PHOTOELECTRIC CONVERSION ELEMENT PANEL
30 . . . INVENTIVE RADIOGRAPHIC IMAGE CONVERSION PANEL
40 . . . DEPOSITION APPARATUS
41 . . . VACUUM CONTAINER
42 . . . VACUUM PUMP
43 . . . DEPOSITION SUBSTRATE
44 . . . HOLDER
45 . . . ROTATING MECHANISM
46 . . . ROTATING SHAFT
47, 47a, 47b, 47c . . . DEPOSITION SOURCES
48 . . . SHUTTERS
50 . . . THICKNESS DIRECTION OF SCINTILLATOR LAYER
60 . . . HEIGHT OF COLUMNAR CRYSTALS
71 . . . END PORTION SIDE (THICKNESS: 100 μm)
72 . . . ROOT PORTION SIDE (THICKNESS: 100 μm)
73 . . . SOLID LINE INDICATING LOWER EXTREMITY OF END PORTION SIDE
74 . . . SOLID LINE INDICATING UPPER EXTREMITY OF ROOT PORTION SIDE
80 . . . ROOTS OF COLUMNAR CRYSTALS

What is claimed is:

1. A radiographic image conversion panel comprising a photoelectric conversion element and a scintillator layer including a phosphor and one or more activators, the phosphor being in the form of columnar crystal,
   the activator concentration in the thickness direction of the scintillator layer giving a profile curve having two or more peaks, wherein the profile curve of the activator concentration is prepared by showing the activator concentrations in every 100 μm thick region in the thickness direction of scintillator layer as bars along a vertical axis on a bar graph versus the locations of the thickness in the scintillator layer as a horizontal axis, and by connecting the middle points of the bars, the resulting profile curve has peaks of activator concentration at both a root portion side of the columnar crystal and in an end portion side opposite to the root portion side,
   the root portion side being a region extending over a thickness of 100 μm from a first principal surface of the scintillator layer, the first principal surface is a starting point of the growth of columnar crystal, and the end portion side being a region extending over a thickness of 100 μm from a second principal surface of the scintillator layer, the second principal surface is the surface opposite to the first principal surface, and
   the amount of activator or activators present in a region of the scintillator layer extending over a thickness of 100 μm from the first principal surface of the scintillator layer opposed to the photoelectric conversion element being 0.3 to 0.7 mol % (relative to the amount of phosphor base compound present in the region taken as 100 mol %).

2. The radiographic image conversion panel according to claim 1, wherein the phosphor in the form of columnar crystal includes cesium iodide (CsI) as a main component.

3. The radiographic image conversion panel according to claim 1, wherein the one or more activators include at least one activator containing a thallium compound (Tl).

4. The radiographic image conversion panel according to claim 1, wherein the phosphor is in the form of a plurality of columnar crystals and the plurality of columnar. crystals have root portions spaced apart from one another.

5. The radiographic image conversion panel according to claim 1, wherein the radiographic image conversion panel further comprises a support and a reflective layer,
   the reflective layer and the scintillator layer are disposed on the support, and
   the reflective layer includes a white pigment and a binder resin.

6. The radiographic image conversion panel according to claim 1, wherein the difference between the maximum value and the minimum value of activator concentration in the activator concentration profile curve is not less than 0.2 mol %.

7. The radiographic image conversion panel according to claim 1, wherein the phosphor in the form of columnar crystal is formed by a gas-phase deposition method.

8. The radiographic image conversion panel according to claim 1, wherein the peak of activator concentration in the root portion side of the columnar crystal in the profile curve is higher than the peak of the activator concentration in the end portion side opposite to the root portion side.

* * * * *